Patented June 2, 1936

2,042,683

UNITED STATES PATENT OFFICE 2,042,683

VAT DYESTUFFS OF THE ANTHRAQUINONE SERIES AND PROCESS OF MAKING SAME

Heinz Scheyer, Frankfort-on-the-Main, and Emil Schwamberger, Frankfort-on-the-Main-Fechenheim, Germany, assignors to General Aniline Works, Inc., New York, N. Y., a corporation of Delaware No Drawing. Application August 7, 1933, Serial No. 684,116. In Germany September 7, 1932

4 Claims. (Cl. 260—60)

Our invention relates to new vat dyestuffs of the anthraquinone series and to a process of making the same.

U. S. Patent No. 1,990,841, describes the manufacture of vat dyestuffs by treating glyoxal-dianthraquinone compounds with an acid condensing agent, such as aluminium chloride, with or without previously converting them into alkali-condensed products.

In accordance with our present invention valuable new vat dyestuffs are obtained by reacting on halogenated derivatives of the said condensation products corresponding probably to the general formula:

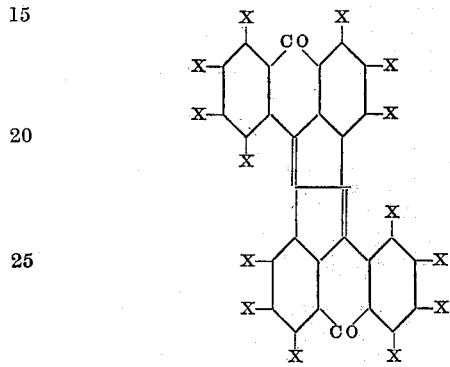

in which one or more radicles signified by X are halogen, with such nitrogeneous compounds as contain in the molecule one or more replaceable hydrogen atoms attached to nitrogen.

The halogenated compounds used as one component may be obtained for example by starting in the process of the said U. S. application Serial Number 638,391 from halogenated anthrones or from the halogenated glyoxal-dianthraquinone compounds or by subsequently introducing halogen into the condensation products of said U. S. application or by carrying out the condensation process according to the said application under such conditions that during the formation of the condensation products, halogen enters into the molecule.

As nitrogeneous compounds to be employed as the second component of the present process one may use, in particular, aromatic amino compounds such as p-toluene-sulfonamide or 1-aminoanthraquinone or 1-amino-5-benzoylamino-anthraquinone.

The present process may be advantageously carried out by heating the components in the presence of a suitable diluent with the addition of an acid binding agent with or without the addition of a catalyst such as a copper salt.

The present new dyestuffs are distinguished from the starting dyestuffs by their nitrogen content, owing to the fact that the halogen atoms in one or more positions signified by X in the above formula are replaced by nitrogeneous groups. They dye cotton from the vat darker and more covered brown shades which are often particularly desirable. The new dyestuffs have a strong tinctorial power and good fastness properties.

Particularly valuable are those dyestuffs which contain as nitrogeneous groups radicles of aminoanthraquinone compounds.

The present new dyestuffs, so far as they are formed by using as second reaction component an aminocompound of the anthraquinone series, correspond probably with the general formula

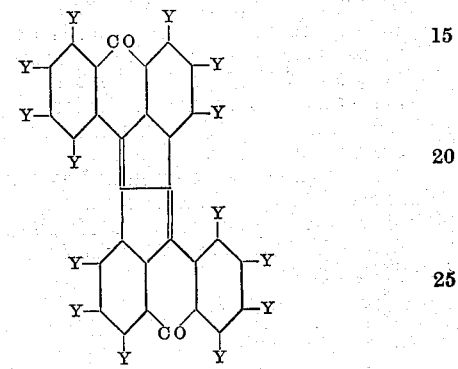

in which one or more radicles signified by Y are radicles of the grouping —NH—A, wherein A means an anthraquinone nucleus which may contain further substituents.

In order to further illustrate our invention the following examples are given, the parts being by weight and all temperatures in centigrade degrees; but we wish it, however, to be understood that our invention is not limited to the particular conditions or specific products mentioned therein:—

*Example 1*

48 parts of the brown dyestuff, obtained by subjecting the condensation product derived from 2-chloro-anthrone and glyoxal sulfate to the action of an alcoholic caustic potash solution and subsequently to an aluminium chloride fusion, are mixed with 50 parts of α-aminoanthraquinone, 20 parts of sodium carbonate, 4 parts of cuprous chloride and about 500 parts of nitrobenzene and the mixture is boiled under reflux for some time. When the whole has cooled to about 80°, the separated dyestuff is filtered off and washed with alcohol and hot water.

The dyestuff thus formed represents, when dry, a blackish brown powder soluble in concentrated sulfuric acid with a reddish blue color which turns to greenish blue upon the addition of paraformaldehyde. The dyestuff dyes cotton from a yellowish brown vat reddish brown shades of good fastness.

The dyestuff corresponds probably to the formula:

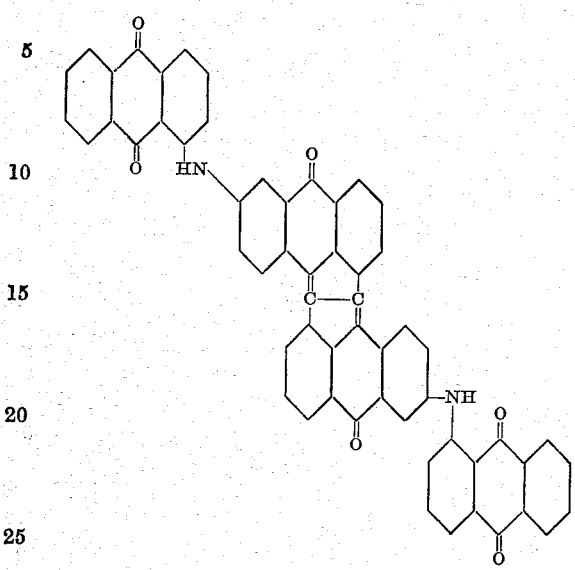

Example 2

48 parts of the starting material used in Example 1 are mixed with 77 parts of 1-amino-5-benzoylamino-anthraquinone, 4 parts of cuprous chloride and 30 parts of anhydrous sodium carbonate and the mixture is boiled with the addition of 500 parts of nitrobenzene in an apparatus provided with a reflux condenser, until the formation of the anthrimide compound has been finished. Then the reaction mass is cooled to about 100° and the precipitate is filtered off, well washed out and dried. The dyestuff thus formed of the probable formula:

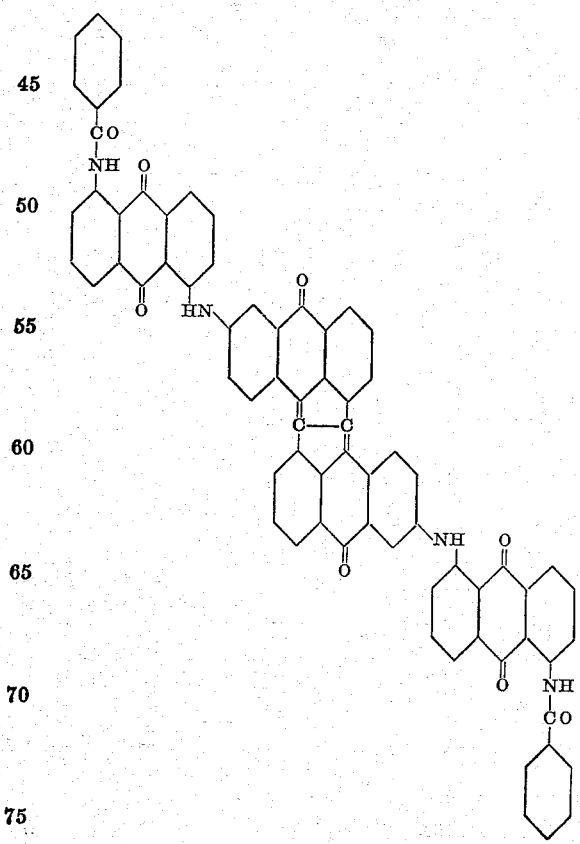

represents a brown powder soluble in concentrated sulfuric acid with a reddish blue color which turns to greenish blue after the addition of paraformaldehyde. The dyestuff dyes cotton blackish brown shades from a yellowish brown vat.

A similar dyestuff is obtained when using, as one reaction component, the glyoxal-dianthraquinone compound derived from 3-chloro-anthrone.

Example 3

48 parts of the brown condensation product, obtained by subjecting the condensation product derived from 1-chloro-anthrone and glyoxal to the action of an alcoholic caustic potash solution and subsequently to an aluminium chloride fusion, are mixed with 50 parts of 1-aminoanthraquinone, 20 parts of potash, 5 parts of finely powdered copper oxide and about 500 parts of naphthalene and the mixture is heated to 200 to 210° for about 8 hours. Then the reaction mass is diluted with about 500 parts of chlorobenzene and the precipitate formed is isolated. The dyestuff of the probable formula

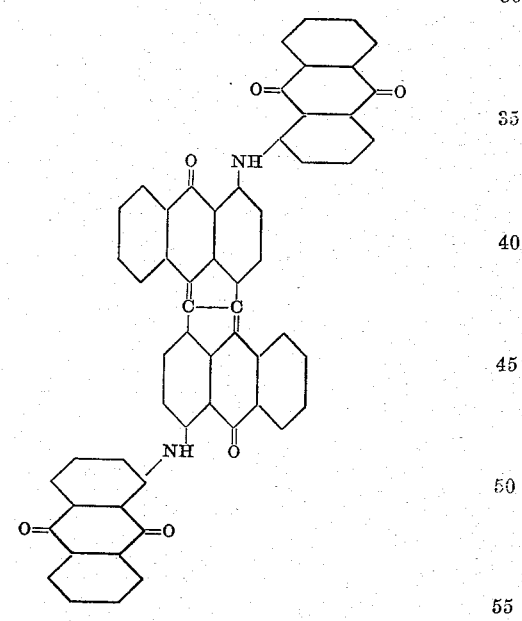

represents when dry a dark reddish brown crystalline powder which dissolves in concentrated sulfuric acid with a dichroic greenish blue color which turns to pure blue after the addition of paraformaldehyde. The new dyestuff dissolves in an alkaline hydrosulfite solution with a brownish violet color and dyes cotton therefrom dark brown shades of a good fastness.

Example 4

A mixture of 48 parts of the starting material used in the foregoing Example 3, 75 parts of 1-amino-5-benzoyl-aminoanthraquinone, 20 parts of potash, 5 parts of copper oxide and about 500 parts of naphthalene is heated for about 6 hours at 200 to 210° and the formed dyestuff of the probable formula:

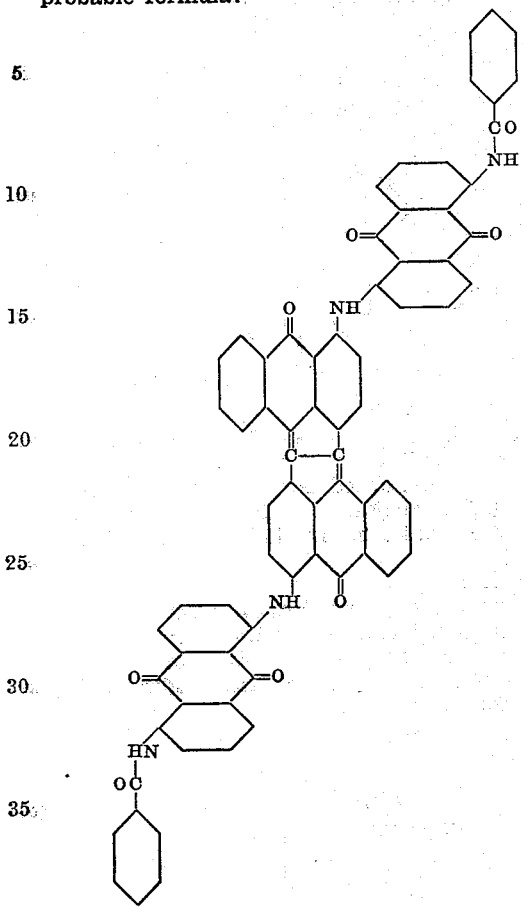

is isolated in the usual manner. It represents when dry a dark brown crystalline powder which dissolves in the vat with a dark reddish violet color and dyes cotton dark brown shades of a very good fastness. The new dyestuff dissolves in concentrated sulfuric acid with a dichroic bluish red color.

When replacing for condensing with the starting material of this example the above-named 1-amino-5-benzoyl-aminoanthraquinone by the corresponding amount of 1-amino-4-methoxy-anthraquinone a dyestuff is obtained which dyes cotton from a greenish vat brown shades of a more bluish tint.

When using as the second reaction component, 1-amino-4-chloro- or 1-amino-6-chloro-anthraquinone or 2-amino-anthraquinone, similar dyestuffs are obtained.

Example 5

48 parts of the starting material of the foregoing Examples 3 and 4 are mixed with 80 parts of p-toluene-sulfamide, 30 parts of potash, 6 parts of copper acetate and about 600 parts of nitrobenzene and the mixture is heated at 195 to 205° for about 6 hours.

The formed condensation product of the probable formula:

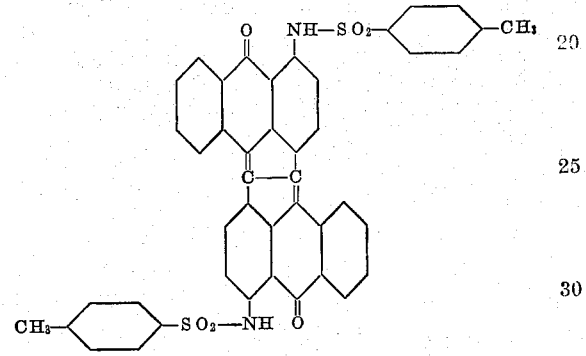

represents, when dry, a yellowish brown powder and dissolves in the vat with a violet color and in concentrated sulfuric acid with a reddish violet color which when gently warmed turns to bluish green on account of the splitting of the p-toluene-sulfonic acid radicle.

Example 6

A mixture of 48 parts of the starting material of the foregoing examples 3 to 5, 77 parts of 1-amino-4-benzoyl-aminoanthraquinone, 4 parts of copper oxide, 35 parts of potash and about 500 parts of naphthalene is heated at about 210° for about 6 hours. After having diluted the reaction mass with about 500 parts of chlorobenzene the condensation product is isolated. It corresponds with the probable formula:

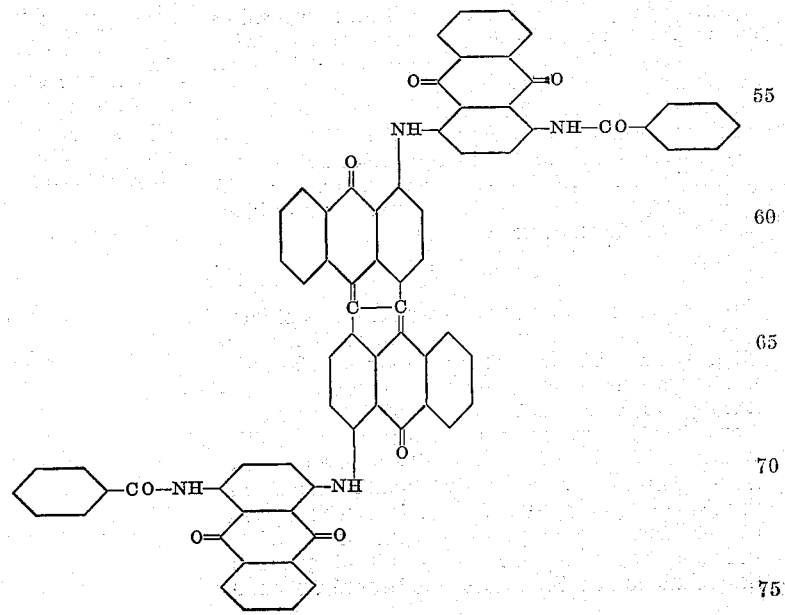

and represents when dry a dark powder dissolving in concentrated sulfuric acid with a dichroic reddish blue color which turns to greenish blue after the addition of paraformaldehyde. The new dyestuff dissolves in the hydrosulfite vat with a reddish violet color and dyes cotton therefrom fast chocolate like brown shades.

When condensing the glyoxal-dianthraquinone-compound derived from 2-chloroanthrone, used in Example 1, with 1-amino-4-benzoylaminoanthraquinone, as described above the formed dyestuff dyes cotton from a reddish brown vat reddish grey shades. It dissolves in sulfuric acid with an olive-green color which turns to blue after the addition of paraformaldehyde.

*Example 7*

The glyoxal-dianthraquinone compound derived from 2-chloroanthrone is treated with bromine in the presence of sulfuric acid monohydrate and 60 parts of the dibromo-derivative which may correspond to the following hypothetical formula

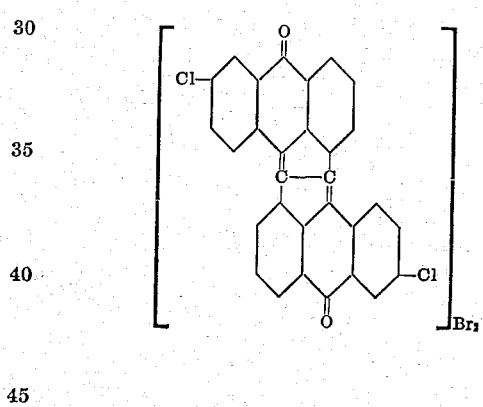

are mixed with 60 parts of 1-aminoanthraquinone, 30 parts of potash, 5 parts of copper acetate and about 600 parts of naphthalene and the mixture is heated at about 210° for about 7 hours while stirring. After having diluted the reaction mass with chlorobenzene, the condensation product which contains probably a plurality of 1-aminoanthraquinone radicles in the positions of a plurality of halogen atoms (but probably a part of the halogen remains unchanged in the molecule) is isolated. It dissolves in concentrated sulfuric acid with a violet color and dyes cotton from a reddish brown vat violetish brown shades.

*Example 8*

A starting material derived from 4-chloroanthrone may be prepared as follows: 10 parts of the condensation product from glyoxalsulfate and 4-chloroanthrone are converted according to Example 2 of U. S. Patent No. 1,990,841, by oxidation with 12 parts of potassium-persulfate in the presence of 200 parts of sulfuric acid monohydrate into the corresponding reddish brown vat dyestuff. 8 parts thereof are mixed with 8 parts of 1-aminoanthraquinone, 4 parts of potash, 1 part of copper acetate and about 80 parts of naphthalene and the mixture is heated for about 8 hours at about 200°. The formed condensation product of the probable formula:

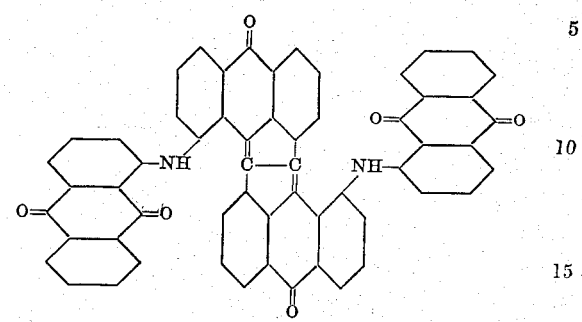

is isolated. It represents a dyestuff dissolving in concentrated sulfuric acid with a greenish blue color which turns to reddish blue after the addition of paraformaldehyde. Said dyestuff dyes cotton dark reddish brown shades from a violet-brown vat.

We claim:

1. A process for manufacturing vat dyestuffs of the anthraquinone series which comprises reacting on halogenated derivatives of glyoxal-dianthraquinone compounds corresponding to the general formula:

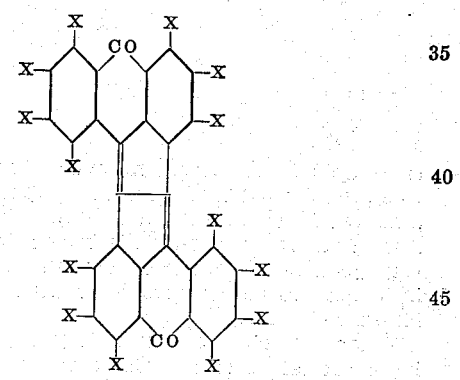

in which one or more radicles signified by X are halogen, with an amine of the benzene or anthraquinone series.

2. A process for manufacturing vat dyestuffs of the anthraquinone series which comprises reacting on halogenated derivatives of glyoxal-dianthraquinone compounds corresponding to the general formula:

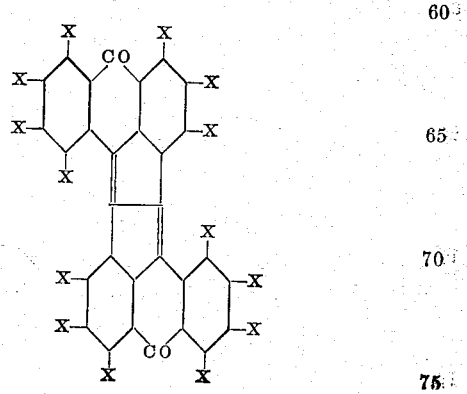

in which one or more radicles signified by X are halogen, with an amino-compound of the anthraquinone series.

3. Vat dyestuffs of the anthraquinone series corresponding to the general formula

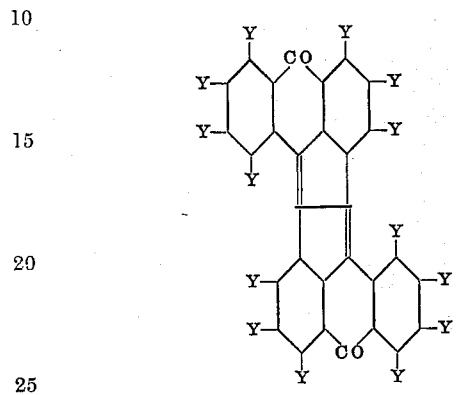

in which at least one radicle signified by Y is a radicle of the grouping —NH—A, wherein A means an anthraquinone nucleus, which dyestuffs dye cotton from the vat strong brownish shades of a good fastness.

4. The vat dyestuff of the anthraquinone series of the formula:

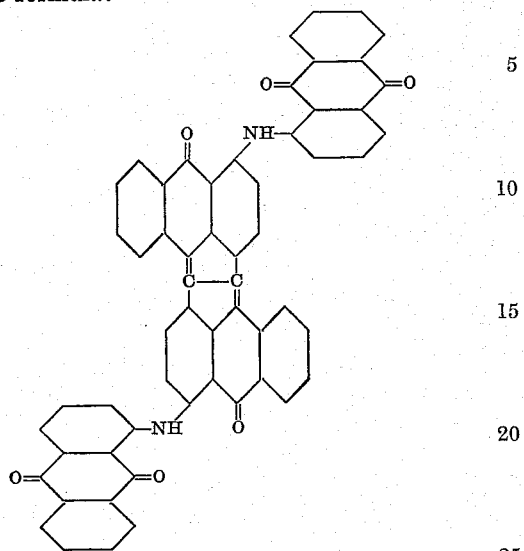

which dyestuff represents when dry a dark reddish brown crystalline powder which dissolves in concentrated sulfuric acid with a dichroic greenish blue color turning to pure blue after the addition of paraformaldehyde, which dyestuff dissolves in an alkaline hydrosulfite solution with a brownish violet color and dyes cotton therefrom dark brown shades of a good fastness.

HEINZ SCHEYER.
EMIL SCHWAMBERGER.